Oct. 2, 1928.
R. E. SLADE
1,686,349
PROCESS OF CONDUCTING GASEOUS CATALYTIC REACTIONS AND APPARATUS THEREFOR
Filed May 1, 1926
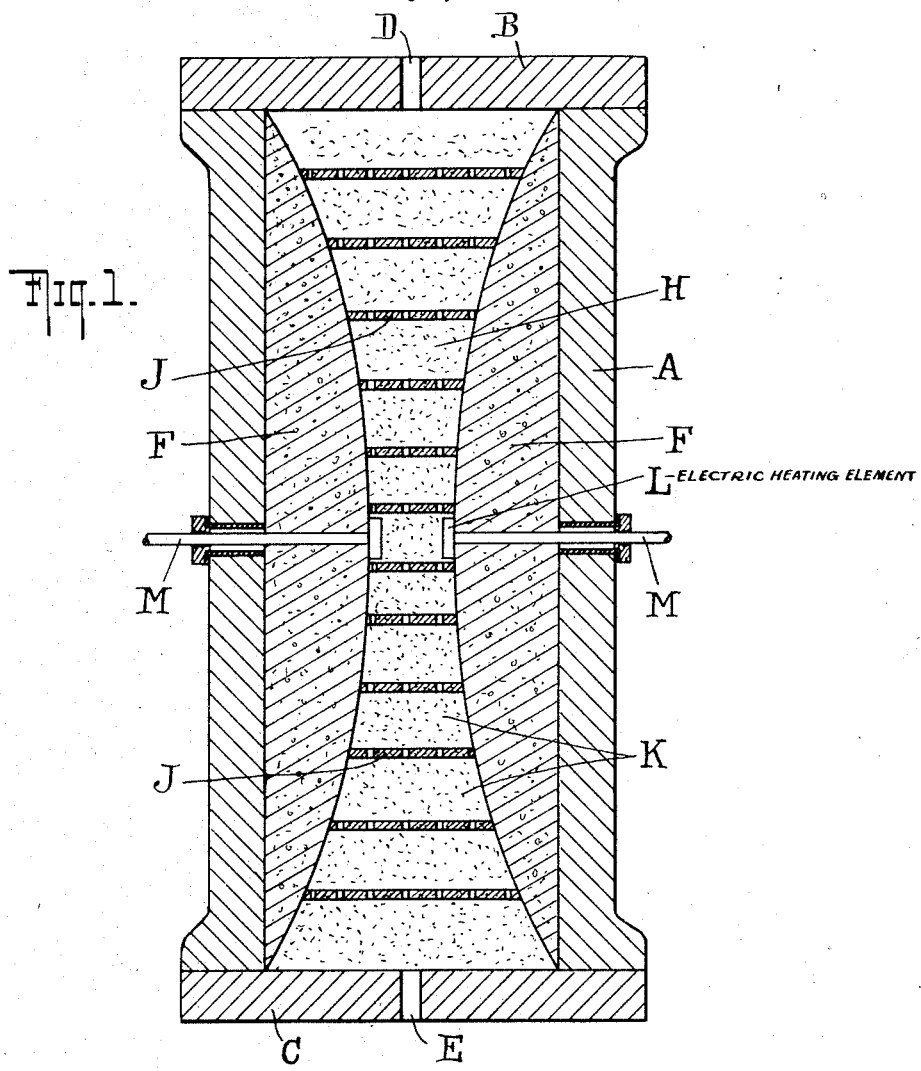
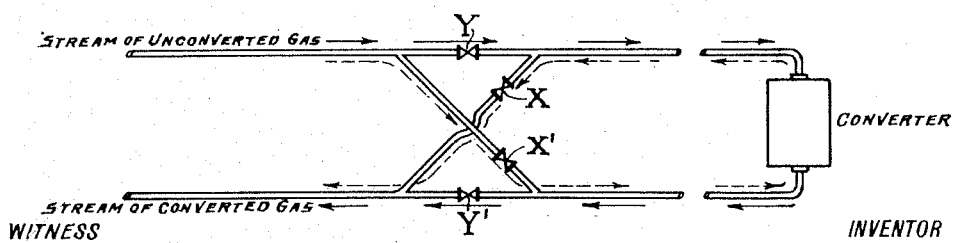
WITNESS
G. V. Rasmussen
INVENTOR
ROLAND E. SLADE
BY
ATTORNEYS Patented Oct. 2, 1928.

1,686,349

UNITED STATES PATENT OFFICE.

ROLAND EDGAR SLADE, OF BILLINGHAM-ON-TEES, ENGLAND, ASSIGNOR TO ATMOSPHERIC NITROGEN CORPORATION, OF NEW YORK, N. Y., A CORPORATION OF NEW YORK.

PROCESS OF CONDUCTING GASEOUS CATALYTIC REACTIONS AND APPARATUS THEREFOR.

Application filed May 1, 1926, Serial No. 106,166, and in Great Britain May 4, 1925.

This invention relates to an improved process and apparatus for the carrying out of gaseous catalytic reactions, particularly reactions, such as the synthesis of ammonia from its elements, which take place at an elevated temperature and with evolution of large quantities of heat.

In carrying out such reactions at elevated temperatures, it is standard practice to conserve the heat of the system by arranging that a large part of the available heat of the hot products shall be imparted to the fresh cold reactants, so that the latter may enter the catalytic chamber at a temperature equal to or not much below that desired in the contact mass. For this purpose a heat interchanger (constituting an addition to the catalytic chamber proper) and a heat interchange operation separate from the catalyst mass have been hitherto employed, but I have now found it possible to dispense with such additional heat interchanger by arranging that a part of the contact mass itself shall act as a regenerator or source of heat for all or a substantial part of the required pre-heating of the fresh gas.

The invention is illustrated in the accompanying drawings in which Fig. 1 illustrates one form of my improved catalytic apparatus, while Fig. 2 shows diagrammatically a gas reversing mechanism for effecting a reversal of gas flow through the catalytic material in the apparatus of Fig. 1.

As shown in Fig. 1 the apparatus consists of a cylindrical envelope A closed at the ends by suitable covers B and C to form a pressure-resisting chamber. Gas ports D and E are provided in the covers B and C respectively. The catalytic material K is contained in what may be termed an enclosing chamber by which is meant that chamber or space which determines the shape of the catalyst bed and which may be identical with the inner configuration of the pressure-sustaining envelop A although preferably the enclosing chamber is established by lining the inner walls of the vessel A with heat insulating material F. This lining is preferably of greater thickness towards the middle of the apparatus and tapers toward the ends of the shell, as indicated in the drawing, and in this way the passage H is made of varying cross-section, being greatest at the ends and smallest in the middle. The space H is divided into a number of compartments by transverse perforated partitions of heat insulating material J, and these compartments are filled with the catalytic material K. In the middle of the apparatus a source of heat, such as an electrical heating coil L, is illustrated, the insulated electrodes M penetrating the walls of the shell through a gas-tight joint.

In the synthesis of ammonia the working of the apparatus is as follows:

The central catalyst compartment (or whichever compartment is selected for initial heating) is heated to a suitably high temperature, say 500° C., by, for example, an electrical heating coil such as L. The escape of heat by conduction through the contact mass is prevented by the perforated heat insulating partitions on either side. A nitrogen-hydrogen mixture, usually under substantial pressure, is then introduced into and passed through the apparatus in the direction D to E, the heater being kept on until the process is well started. This mixture need not be preheated before entering the apparatus, and may be at ordinary temperature. On meeting the hot part of the contact mass some nitrogen and hydrogen combine to form ammonia and heat is liberated. On the other hand, the cold gases streaming from D chill the nearer border of the hot zone, and also tend to carry the heat evolved by the reaction in the direction towards E, so that the final result is that the hot reaction zone is displaced more and more towards E and the synthesis is accomplished in this traveling zone. The gases, which of course travel faster than the zone, then traverse the remaining part of the contact mass, and during this time they are subject to a continually decreasing temperature. Moreover, on account of the shape of the enclosure, the gases travel more slowly towards the outlet and they are therefore a longer time in contact with the catalyst than would be the case if the catalyst chamber were just cylindrical. This relatively prolonged contact with catalyst at a lower temperature than that of the main synthesis zone tends to enrich the ammonia content of the gas, i. e., full advantage is taken of the synthesizing power of the remaining catalyst. In addition, the end portion of the bed of catalyst takes up nearly all, or the desired amount of, the sensible heat of the gases and the gaseous resultants therefore pass off at a relatively low temperature, e. g., 100° C.

When the hot zone approaches the end of the apparatus, so that, if the operation is continued, the gases will begin to leave while still at a relatively high temperature, the direction of the gas flow is reversed, and the hot zone now travels back toward the other end of the chamber. This reversal may be effected by means such as are indicated in Fig. 2 where, when valves X, X' are closed and valves Y, Y' open, the gases flow in the direction of the full line arrows while, when the valves Y, Y' are closed and the valves X, X' are open, the gas flows in the reverse direction.

By suitably reversing the gas flow the hot zone may be made to travel to and fro between selectable limits, while the remainder, i. e., the temporarily inactive end portions of the contact mass, act as heat regenerators, one end portion preheating the fresh gases to the reaction temperature, and the other end portion absorbing and storing heat from the hot resultant gases. Once started the process is autothermic and needs no external supply of heat, so that after the initial heating period the flow of current through the heating coil L is discontinued. It may even be advisable to remove some of the heat generated within the chamber, and in general this will be the case when the percentage of ammonia synthesized is relatively high. In such a case the excess of heat, which would prevent the maintenance of the optimum temperature, may be removed by cooling means such as water cooled tubes placed within the apparatus. Suitable arrangements are of course made for recording the temperature in the different parts of the apparatus.

If the contact mass were of such a nature that it conducted heat only very slowly, the heat insulating partitions J might be dispensed with, but with catalysts of a metallic nature the use of insulating partitions or their equivalent is obviously preferred. Of course, the process need not be so conducted as to take place wholly within a single shell or chamber, but may be conducted in a plurality of chambers connected in series. In that case each chamber will correspond to one or more of the catalyst compartments of Fig. 1.

My invention greatly simplifies the apparatus for synthetic processes such as the synthesis of ammonia from its elements, and simplifies the process itself. The number of vessels is reduced and their design is simplified. The ordinary type of heat interchanger with its two series of separate gas passages is relatively complicated and expensive, particularly when high pressures and temperatures and inflammable gases are involved as in ammonia synthesis. Heat utilization is favored.

In addition, the catalytic reaction itself is improved. By making the heat interchange or preheating step continuous with the subsequent catalysis step and by carrying out the preheating step by contacting the gases with hot catalyst material, the conditions for the desired catayltic reaction are at once and always present. So soon as the fresh gases have reached a reaction temperature, no matter how small the reaction tendency may be, and no matter what the required reaction temperature may be, the reaction begins. With an installation containing separate heat-interchanger and converter units, the temperature in the portions of the exchanger next to the converter may be sufficient to cause some reaction, but this tendency cannot be utilized as no catalyst is available, i. e. by means of my invention the catalytic reaction proceeds throughout the entire reaction temperature range which prevails during the entire operation including the so-called preheating, catalysis, and cooling steps or stages.

It will be noted that, although the material between the partitions J is preferably material of the same character throughout, to wit, catalyst material, the arrangement may be modified so that such part of the material as serves primarily as the heat-interchange medium may be constituted of refractory brick or other material which, while possessing the heat-absorbing and transmitting qualities of the catalyst material, is not in or of itself a catalyst. In a similar way various other modifications and variations in detail may obviously be made without departing from the spirit of the invention.

I claim:

1. The process of conducting exothermic gaseous catalytic reactions which comprises preheating a stream of uncatalyzed gases by passing them in contact with a hot body of heat-storing material, conducting said preheated stream of gases in contact with and through a body of catalyst material to cause the exothermic reaction to progress in the direction of the flow of the gases from the region of the inlet end of the said catalyst material toward the region of the exit end thereof, leading the hot catalyzed gases of the foregoing steps in contact with a second body of heat-storing material to remove heat from said gases, continuing the aforesaid steps until the portion of the catalyst material in the region of the exit end is at a higher thermal state than the correspondingly located material of the inlet end and thereupon causing the stream of gases to flow, in a reversed direction and under the aforesaid operating conditions, first in contact with the heat-storing material of the third step, now in a hot condition, then in contact with the catalyst, as heretofore set forth, and finally in contact with the heat-storing material of the first step in order to re-heat it, and repeating the aforesaid steps as a continuously functioning catalytic procedure with substantially regular reversals of flow of gases.

2. The process of conducting exothermic gaseous catalytic reactions which comprises setting up a zone of reaction temperature within the catalyst bed, introducing the gas at one end of the catalyst bed at a temperature substantially below that of the reaction zone, whereby the reaction zone is caused to travel in the direction of flow of the gases, continuing the aforesaid steps until the portion of the catalyst material in the region of the exit end is at a higher thermal state than the correspondingly located material of the inlet end, and successively reversing the flow whenever the temperature of the gas exit end of the catalyst bed begins to exceed that which prevailed at the gas inlet end of the bed at the time when said end commenced to serve as the inlet for the gas.

3. The process of conducting exothermic gaseous catalytic reactions which comprises setting up a zone of reaction temperature within the catalyst bed, introducing the gas at one end of the catalyst bed at a temperature substantially below that of the reaction zone, whereby the reaction zone is caused to travel in the direction of flow of the gases and successively reversing the flow whenever the temperature of the gas exit end of the catalyst bed begins to exceed that which prevailed at the gas inlet end of the bed at the time when said end commenced to serve as the inlet for the gas.

4. A process such as set forth in claim 1 in which both of the bodies of heat-storing material are constituted of material of the same constitution as the intervening catalyst material.

5. A process such as set forth in claim 1 in which the gas stream flows with a lower velocity while passing through the heat-storing material than while passing through the intervening catalyzing material.

6. The process of conducting exothermic gaseous catalytic reactions which comprises causing a zone of high temperature to oscillate from a point adjacent one end of the catalyst body to a point adjacent the other end of said body by maintaining the extreme ends of the bed constantly below that of the reaction zone by introducing the gaseous reactants at temperatures materially below that of the reaction and by alternating the flow of gaseous reactants through said catalyst body.

7. The process of carrying out exothermic gaseous catalytic reactions without an ordinary heat interchanger or with cooling in which the fresh cold gases are passed through a body of catalyst containing available heat and then through a hot zone of the catalyst and finally through a further body of catalyst to which a large part of the available heat is given up, then when the first parts of the catalyst have become cold and the last parts sufficiently hot, reversing the direction of gas flow, so that the conditions for the catalytic reaction are once more favorable.

8. Apparatus for conducting exothermic gaseous catalytic reactions which comprises an enclosing chamber constricted at its middle portions, catalyst material in the constricted middle portions of said chamber, externally controlled means for heating the catalyst at a constricted portion of the same chamber, heat-storing material at each end of said catalyst body, arranged as heat regenerators, and a gas port operatively associated with each heat regenerator.

9. Apparatus for conducting exothermic gaseous catalytic reactions which comprises an enclosing chamber constricted at its middle portion, catalyst material in the constricted middle portion of said chamber, heat-storing material at each end of said catalyst body arranged as heat regenerators, and a gas port operatively associated with each heat regenerator.

10. Apparatus for conducting exothermic gaseous catalytic reactions which comprises an enclosing chamber constricted at its middle portion, catalyst material in the constricted middle portions of said chamber, heat-storing material at each end of said catalyst body arranged as heat regenerators, and a gas port operatively associated with each heat regenerator, the heat-storing material and the intervening catalyst material being constituted throughout of catalyst substance.

11. Apparatus for conducting exothermic gaseous catalytic reactions which comprises an enclosing chamber, catalyst material in the middle of said chamber, heat-storing material at each end of said catalyst body arranged as heat regenerators, and a gas port operatively associated with each heat regenerator, the heat-storing material and the intervening catalyst material being constituted throughout of catalyst substance arranged in compartments separated by gas-permeable heat insulating partitions.

12. Apparatus for conducting exothermic gaseous catalytic reactions which comprises an enclosing chamber, heat insulating material associated with the inner walls of said chamber and diminishing in thickness from the center to the ends of the chamber, and defining the gas passage through said chamber, catalyst material in the middle constricted part of said passage, heat-storing material at the outer wider parts of said passage, and a gas port operatively associated with each of the outer ends of said passage.

13. Apparatus for conducting exothermic gaseous catalytic reactions which comprises an enclosing chamber constricted at its middle portion, catalyst material in the constricted middle portions of said chamber, heat-storing material at each end of said catalyst body arranged as heat regenerators, a gas port operatively associated with each heat regenerator, and means associated with said gas ports adapted to establish a gas flow through either one of said ports as a gas inlet port and out through the other as a gas exit port.

In testimony whereof I have hereunto set my hand.

ROLAND EDGAR SLADE.